(12) United States Patent
Lee

(10) Patent No.: US 6,234,753 B1
(45) Date of Patent: May 22, 2001

(54) TURBINE AIRFOIL WITH INTERNAL COOLING

(75) Inventor: Ching-Pang Lee, Cincinnati, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/317,241

(22) Filed: May 24, 1999

(51) Int. Cl.[7] ..................................................... F01D 5/18
(52) U.S. Cl. ......................................... 416/97 R; 415/115
(58) Field of Search ............................... 416/96 A, 96 R, 416/97 A, 97 R; 415/115; 164/369

(56) References Cited

U.S. PATENT DOCUMENTS 5,271,715 * 12/1993 Zelesky et al. ..................... 416/97 R
5,816,777 * 10/1998 Hall ..................................... 416/97 R

* cited by examiner

Primary Examiner—Edward K. Look
Assistant Examiner—James M M McAleenan
(74) Attorney, Agent, or Firm—Andrew C. Hess; Rodney M. Young

(57) ABSTRACT

The flow of cooling fluid through core tie holes formed between the internal cooling passageways of turbine airfoils is reduced by disposing flow deflectors on the wall adjacent to the holes. The deflectors alter the local static pressure near the holes, thereby minimizing the pressure differential across the holes so as to reduce the flow of cooling fluid.

16 Claims, 1 Drawing Sheet

TURBINE AIRFOIL WITH INTERNAL COOLING

BACKGROUND OF THE INVENTION

The present invention relates generally to gas turbine engines, and more particularly to internally cooled airfoils used in such engines.

Gas turbine engines, such as aircraft jet engines, include many components (e.g., turbines, compressors, fans and the like) that utilize airfoils. Turbine airfoils, such as turbine blades and nozzle vanes, which are exposed to the highest operating temperatures, typically employ internal cooling to keep the airfoil temperatures within certain design limits. A turbine rotor blade, for example, has a shank portion that is attached to a rotating turbine rotor disk and an airfoil blade portion which is employed to extract useful work from the hot gases exiting the engine's combustor. The airfoil includes a blade root that is attached to the shank and a blade tip that is the free end of the airfoil blade. Typically, the airfoil of the turbine rotor blade is cooled by air (normally bled from the engine's compressor) passing through an internal circuit, with the air entering near the airfoil blade root and exiting near the airfoil blade tip as well as through film cooling holes near the airfoil blade's leading edge and through trailing edge cooling holes. Known turbine blade cooling circuits include a plurality of radially-oriented passageways that are series-connected to produce a serpentine flow path, thereby increasing cooling effectiveness by extending the length of the coolant flow path. It is also known to provide additional, unconnected passageways adjacent to the serpentine cooling circuit.

Turbine rotor blades with internal cooling circuits are typically manufactured using an investment casting process commonly referred to as the lost wax process. This process comprises enveloping a ceramic core defining the internal cooling circuit in wax shaped to the desired configuration of the turbine blade. The wax assembly is then repeatedly dipped into a liquid ceramic solution such that a hard ceramic shell is formed thereon. Next, the wax is melted out of the shell so that the remaining mold consists of the internal ceramic core, the external ceramic shell and the space therebetween, previously filled with wax. The empty space is then filled with molten metal. After the metal cools and solidifies, the external shell is broken and removed, exposing the metal that has taken the shape of the void created by the removal of the wax. The internal ceramic core is dissolved via a leaching process. The metal component now has the desired shape of the turbine blade with the internal cooling circuit.

In casting turbine blades with serpentine cooling circuits, the internal ceramic core is formed as a serpentine element having a number of long, thin branches. This presents the challenge of making the core sturdy enough to survive the pouring of the metal while maintaining the stringent requirements for positioning the core. Furthermore, the thin branches of the serpentine core can experience relative movement if not stabilized in some manner. Thus, core ties (i.e., small ceramic pins connecting various branches) are used to accurately position the core and prevent relative movement of the core branches such that the thicknesses of the walls separating adjacent passageways of the serpentine cooling circuit are controlled better. After casting, when they have been removed along with the core, the core ties leave holes in the walls. These core tie holes provide unwanted flow communication between adjacent passageways due to a pressure differential that typically exists between the two passageways. That is, cooling fluid in the higher pressure passageway will flow into the lower pressure passageway through the core tie hole. This will result in an undesirable cooling flow distribution compared to the original design intent.

Accordingly, there is a need for a turbine airfoil in which cooling fluid flow through core tie holes is minimized.

SUMMARY OF THE INVENTION

The above-mentioned needs are met by the present invention which provides an airfoil comprising at least two internal cooling passageways separated by a wall having a core tie hole formed therein. Flow deflectors disposed on the wall adjacent to the hole alter the local static pressure near the hole to minimize the pressure differential across the hole. This reduces the flow of cooling fluid through the core tie hole.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
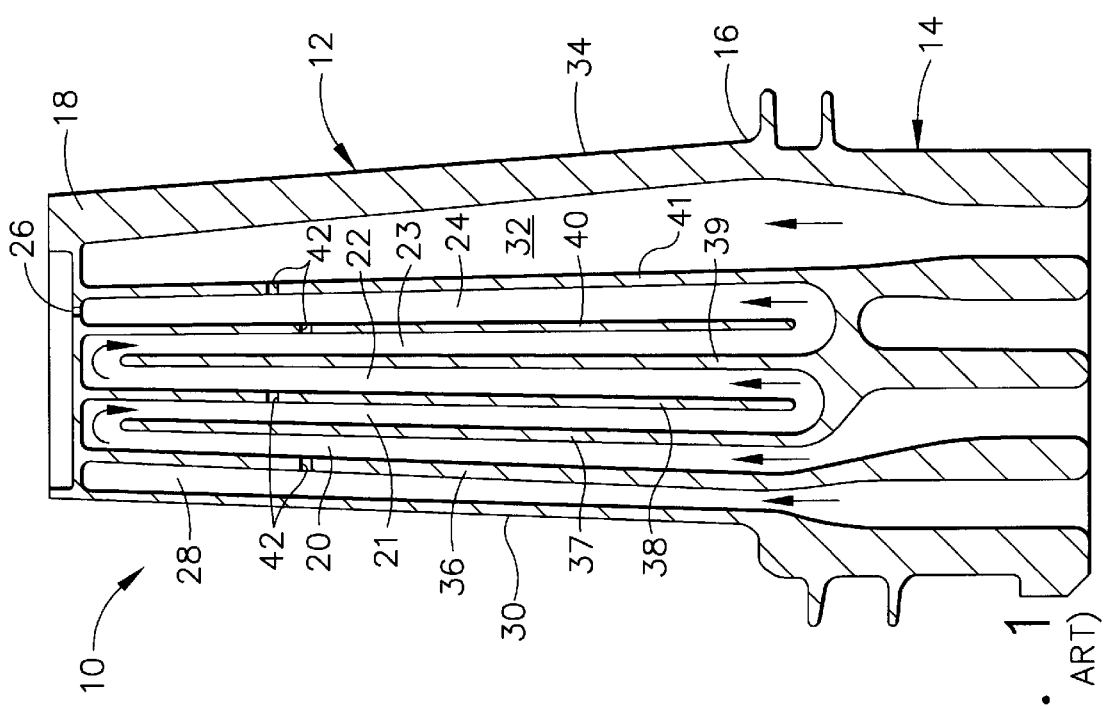
FIG. 1 is a longitudinal cross-sectional view of a prior art turbine blade.

Referring to the drawings wherein identical reference numerals denote the same elements throughout the various views, FIG. 1 shows a prior art gas turbine engine rotor blade 10 having a hollow airfoil 12 and an integral shank 14 for mounting the airfoil 12 to a rotor disk (not shown) in a conventionally known manner. The airfoil 12 extends longitudinally or radially upwardly from a blade root 16 disposed at the top of the shank 14 to a blade tip 18. The airfoil 12 includes an internal serpentine coolant circuit having five series-connected, generally radially extending coolant passageways 20–24.

The first passageway 20 receives a cooling fluid (usually a portion of relatively cool compressed air bled from the compressor (not shown) of the gas turbine engine) through the shank 14. The cooling fluid travels radially outwardly through the first passageway 20, passes into the second passageway 21 and then flows radially inwardly through the second passageway 21. From there, the cooling fluid similarly passes in series through the other passageways 22–24, thereby cooling the airfoil 12 from the heating effect of the combustion gases flowing over the outer surfaces thereof. The cooling fluid exits the airfoil 12 through an opening 26 in the blade tip 18.

The airfoil 12 includes a leading edge coolant passageway 28 in addition to the serpentine cooling circuit. The leading edge passageway 28 extends radially between the airfoil leading edge 30 and the first passageway 20 and is not connected to the serpentine cooling circuit. A separate flow of cooling fluid is introduced through the shank 14. The cooling fluid flows radially through the leading edge passageway 28 and is discharged from the airfoil 12 through conventional film cooling holes and/or a tip hole (not shown) formed through the exterior wall of the airfoil 12. Similarly, a radially extending trailing edge coolant passageway 32 is disposed between the airfoil trailing edge 34 and the fifth passageway 24 of the serpentine cooling circuit. The trailing edge passageway 32 is also not connected to the serpentine cooling circuit and receives another separate flow of cooling fluid through the shank 14. This cooling fluid flows radially through the trailing edge passageway 32 and is discharged in part from the airfoil 12 through a conventional row of trailing edge holes and/or a tip hole (not shown). The arrows in FIG. 1 indicate the various paths of cooling fluid flow.

As seen in FIG. 1, each one of the passageways 20–24, 28, 32 is separated from adjacent passageways by six radially extending walls 36–41. That is, the leading edge passageway 28 and the first passageway 20 of the serpentine cooling circuit are separated by a first wall 36, the first passageway 20 and the second passageway 21 are separated by a second wall 37, and so on. At least some of the walls 36–41 have a core tie hole 42 formed therein due to the use of core ties in the casting process. Specifically, the prior art blade 10 of FIG. 1 has core tie holes 42 formed in the first wall 36, the third wall 38, the fifth wall 40 and the sixth wall 41, although other configurations are possible depending on how the core ties are deployed during the casting process. Core tie holes, which are often elliptical in cross-section, typically have an equivalent diameter of about 30–100 mils.

Each core tie hole 42 will provide an unwanted flow of cooling fluid between the adjacent passageways it connects if there is a pressure differential between the two passageways. The passageways 20–24 of the serpentine cooling circuit will generally have pressure differentials because the pressure tends to decrease along the serpentine flow path due to friction and turning losses as the cooling fluid passes into successive passageways. Thus, the pressure in the first passageway 20 is greater than the pressure in the second passageway 21, which in turn is greater than the pressure in the third passageway 22 and so on to the fifth passageway 24 which has the lowest pressure. The pressures in the leading edge passageway 28 and the trailing edge passageway 32 will be substantially equal to the pressure in the first passageway 20 because each of these passageways is directly connected to the inlet of cooling fluid through the shank 14. Accordingly, the pressure in the fifth passageway 24 will be less than the pressure in the trailing edge passageway 32.

Because of these pressure differentials, cooling fluid will pass from the second passageway 21 to the third passageway 22 through the core tie hole 42 in the third wall 38, from the fourth passageway 23 to the fifth passageway 24 through the core tie hole 42 in the fifth wall 40, and from the trailing edge passageway 32 to the fifth passageway 24 through the core tie hole 42 in the sixth wall 41. The flow of cooling fluid through the core tie holes 42 produces an undesirable cooling flow distribution. Cooling fluid will generally not flow through the core tie hole 42 in the first wall 36 because the pressures in the leading edge passageway 28 and the first passageway 20 are substantially equal.

Figure 2:
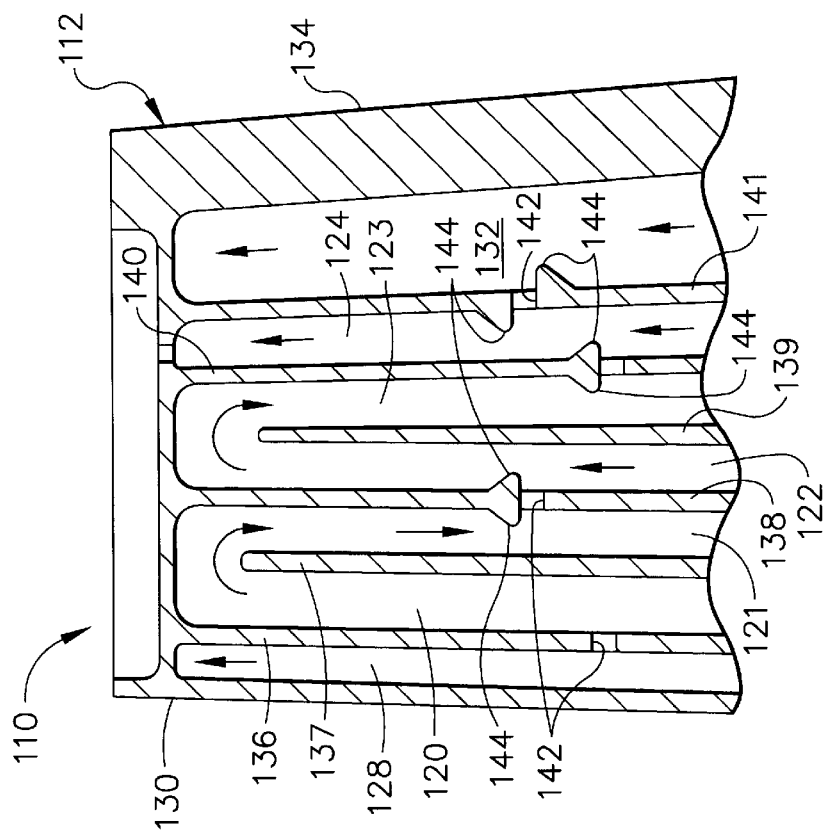
FIG. 2 is a longitudinal cross-sectional view of a portion of a turbine blade having the flow deflectors of the present invention.

Referring now to FIG. 2, a turbine blade 110 is shown in which cooling fluid flow through core tie holes is minimized. For purposes of illustration only, the blade 110 has the same cooling circuit configuration as the blade 10 of FIG. 1. However, it should be noted that the present invention is applicable to turbine blades having any type of cooling circuit configuration containing core tie holes. Furthermore, as will become apparent from the following description, the present invention is not limited to turbine blades and could be used with other types of airfoil components such as turbine nozzles.

Accordingly, the blade 110 has a hollow airfoil 112 and an integral shank (not shown in FIG. 2 but essentially identical to the shank 14 of FIG. 1). The airfoil 112 includes a serpentine cooling circuit having five series-connected, generally radially extending coolant passageways 120–124, a leading edge coolant passageway 128 extending radially between airfoil leading edge 130 and the first passageway 120, and a radially extending trailing edge coolant passageway 132 disposed between airfoil trailing edge 134 and the fifth passageway 124. The passageways 120–124, 128, 132 are supplied with cooling fluid through the shank of the blade 110 in the same manner as described above with respect to the conventional blade 10. Each one of the passageways 120–124, 128, 132 is separated from adjacent passageways by six radially extending walls 136–141. A core tie hole 142 is formed in the first wall 136, the third wall 138, the fifth wall 140 and the sixth wall 141, although other configurations are possible depending on how the core ties are deployed during the casting process.

The present invention uses a plurality of flow deflectors 144 to change local pressures around the core tie holes 142 so as to reduce cooling fluid flow through the core tie holes 142. Because core tie holes are perpendicular to the direction of flow in the passageways, the unwanted flow of cooling fluid through these holes in conventional airfoils is due to differences in static pressure only. Thus, the deflectors 144, which are preferably integral parts of the casting, are positioned on the separating walls so as to have a favorable impact on the static pressure in the vicinity of the core tie holes 142. Specifically, the deflectors 144 minimize the pressure differential across the core tie holes 142.

Generally, each core tie hole 142 has two of the deflectors 144 associated with it. Regarding the core tie hole 142 in the third wall 138, which separates the second and third passageways 121, 122, one deflector 144 is disposed in the second passageway 121, adjacent to and upstream of the core tie hole 142, and another deflector 144 is disposed in the third passageway 122, adjacent to and downstream of the core tie hole 142. By being located upstream of the core tie hole 142 in the second passageway 121, which is the higher pressure passageway, the deflector 144 will accelerate the flow at this point and thereby decrease the local static pressure at the core tie hole 142 in the second passageway 121. Conversely, the deflector 144 in the lower pressure third passageway 122, which is located downstream of the core tie hole 142, will create a small stagnation point so as to "capture" some of the dynamic pressure and increase the local static pressure at the core tie hole 142 in the third passageway 122. By decreasing the local static pressure in the higher pressure second passageway 121 and increasing the local static pressure in the lower pressure third passageway 122, the static pressure differential across the core tie hole 142 will be minimized, which in turn will minimize the flow of cooling fluid through the core tie hole 142.

The present invention is applicable to both counter flow passageways, such as the second and third passageways 121, 122, and parallel flow passageways. Thus, the deflectors 144 associated with the core tie hole 142 in the fifth wall 140, which separates the counter flowing fourth and fifth passageways 123, 124, are similar in appearance to the deflectors 144 of the core tie hole 142 in the third wall 138 in that the deflectors 144 of each set are located at the same radial position. However, the deflectors 144 associated with the core tie hole 142 in the sixth wall 141, which separates the parallel flowing fifth and trailing edge passageways 124, 132, are located at different radial positions. This difference is due to the fact that the fifth and trailing edge passageways 124, 132 have parallel flows. That is, the deflector 144 in the higher pressure passageway, the trailing edge passageway 132, is located upstream of the core tie hole 142, and the deflector 144 in the lower pressure fifth passageway 124 is located downstream of the core tie hole 142. Because of the parallel flow, the two deflectors 144 are on radially opposite sides of the core tie hole 142. Despite this difference, the deflectors 144 disposed on the sixth wall 141 function in the same manner as the other deflectors. Specifically, the deflector 144 in the higher pressure trailing edge passageway 132 accelerates the flow so as to decrease the local static pressure at the core tie hole 142 in the trailing edge passageway 132. The deflector 144 in the lower pressure fifth passageway 124 creates a small stagnation point, thereby increasing the local static pressure at the core tie hole 142 in the fifth passageway 124. Accordingly, the flow of cooling fluid through the core tie hole 142 is decreased because the static pressure differential across the core tie hole 142 is minimized.

The core tie hole 142 in the first wall 136, which separates the leading edge passageway 128 from the first passageway 120, does not have any deflectors associated therewith because the first and leading edge passageways 120, 128 have substantially equal pressures.

As seen in FIG. 2, the deflectors 144 preferably have a shape in which one side presents a sloped surface and the other side is more blunt. Not only does this configuration facilitate casting of the deflectors 144, but it also enhances the intended function of the deflectors 144 as follows. The deflectors 144 disposed in higher pressure passageways are arranged with the sloped side facing the flow (i.e., facing upstream). This way, the deflectors 144 are able to accelerate flow without causing an excessive pressure drop beyond the desired change in the local static pressure. The deflectors 144 disposed in lower pressure passageways are arranged with the blunt side facing the flow (i.e., facing upstream) so as to provide a sufficient stagnation point.

The deflectors 144 are sized so as to perform their intended function without adversely affecting the cooling flow. Preferably, the deflectors 144 will have a "height" (i.e., the distance a deflector protrudes from the wall it is disposed on) which is substantially equal to the diameter of the associated core tie hole 142. However, this is provided that the deflectors 144 will preferably block less than 20% of the flow area, and more preferably less than 10% of the flow area.

The foregoing has described a turbine airfoil in which cooling fluid flow through core tie holes is minimized. While specific embodiments of the present invention have been described, it will be apparent to those skilled in the art that various modifications thereto can be made without departing from the spirit and scope of the invention as defined in the appended claims.

What is claimed is:

1. An airfoil comprising:
    first and second internal cooling passageways separated by a wall having at least one hole formed therein, said hole being formed by a core tie used during casting of said airfoil; and
    a deflector disposed on said wall adjacent to said hole.
2. The airfoil of claim 1 wherein said deflector is disposed upstream of s aid hole.
3. The airfoil of claim 1 wherein said deflector is disposed downstream of said hole.
4. The airfoil of claim 1 further comprising a second deflector disposed on said wall adjacent to said hole, wherein said first-mentioned deflector is disposed in said first passageway and said second deflector is disposed in said second passageway.
5. The airfoil of claim 4 wherein said first passageway has a greater pressure than said second passageway.
6. The airfoil of claim 5 wherein said first-mentioned deflector is disposed upstream of said hole and said second deflector is disposed downstream of said hole.
7. The airfoil of claim 5 wherein both said first-mentioned deflector and said second deflector have a sloped side and a blunt side, said first-mentioned deflector being arranged so that its sloped side is facing upstream and said second deflector being arranged so that its blunt side is facing upstream.
8. The airfoil of claim 1 wherein said deflector has a height that is approximately equal to one hole diameter.
9. An airfoil comprising:
    first and second internal cooling passageways separated by a wall having at least one hole formed therein, said first passageway having a greater pressure than said second passageway; and
    means for changing local static pressure immediately adjacent said hole so as to minimize the pressure differential across said hole.
10. The airfoil of claim 9 wherein said means for changing local static pressure comprises a first deflector disposed in said first passageway adjacent to and upstream of said hole and a second deflector disposed in said second passageway adjacent to and downstream of said hole.
11. The airfoil of claim 10 wherein both said first and second deflectors have a sloped side and a blunt side, said first deflector being arranged so that its sloped side is facing upstream and said second deflector being arranged so that its blunt side is facing upstream.
12. The airfoil of claim 10 wherein each of said first and second deflectors has a height that is approximately equal to one hole diameter.
13. The airfoil of claim 9 wherein said hole is formed by a core tie used during casting of said airfoil.
14. An airfoil comprising:
    an internal serpentine coolant circuit having a plurality of series-connected coolant passageways, adjacent ones of said passageways being separated by a wall having a core tie hole formed therein;
    a first deflector disposed on said wall in a first one of said passageways, said first deflector being located adjacent to and upstream of said core tie hole; and
    a second deflector disposed on said wall in a second one of said passageways, said second deflector being located adjacent to and downstream of said core tie hole, wherein said second one of said passageways has a lower pressure than said first one of said passageways.
15. The airfoil of claim 14 wherein both said first and second deflectors have a sloped side and a blunt side, said first deflector being arranged so that its sloped side is facing upstream and said second deflector being arranged so that its blunt side is facing upstream.
16. The airfoil of claim 14 wherein each of said first and second deflectors has a height that is approximately equal to one hole diameter.

* * * * *